United States Patent
Beim et al.

[11] Patent Number: 5,868,645
[45] Date of Patent: Feb. 9, 1999

[54] MULTIPLE SPEED AUTOMOTIVE TRANSMISSION

[75] Inventors: Rudolf Beim, Bloomfield Hills; David A. Janson, Plymouth, both of Mich.

[73] Assignee: Ford Global Technologies, Inc., Dearborn, Mich.

[21] Appl. No.: 992,279

[22] Filed: Dec. 17, 1997

[51] Int. Cl.⁶ .................................................. F16H 3/62
[52] U.S. Cl. .......................... 475/271; 475/269; 475/296
[58] Field of Search .................................. 475/269, 271, 475/275, 276, 277, 278, 279, 296, 298; 188/77 R, 77 W

[56] References Cited

U.S. PATENT DOCUMENTS

| | | |
|---|---|---|
| 787,908 | 4/1905 | Ford . |
| 1,005,186 | 10/1911 | Ford . |
| 1,009,954 | 11/1911 | Briones ................................. 475/276 |
| 1,073,569 | 9/1913 | Ford . |

*Primary Examiner*—Charles A. Marmor
*Assistant Examiner*—Sherry Lynn Estremsky
*Attorney, Agent, or Firm*—Frank G. McKenzie

[57] ABSTRACT

A multiple speed transmission producing a gear ratio in response to movement of a gear selector lever and manipulation of a clutch pedal includes three planetary gearsets each including a sun gear, ring gear, carrier rotatably supporting a set of planet pinions in continues meshing engagement with the corresponding sun gear and ring gear, and a brake drum driveably connected to one component of each gearset and adapted for alternate engagement by a brake band. The brake band is biased into engagement with the corresponding brake drum by a spring and is released from that engagement using a clutch pedal. A shift lever moves the band to the gearset that produces the desired gear ratio. Engagement of the brake band with each of the drums holds a component of the gearset against rotation on the transmission housing.

7 Claims, 3 Drawing Sheets

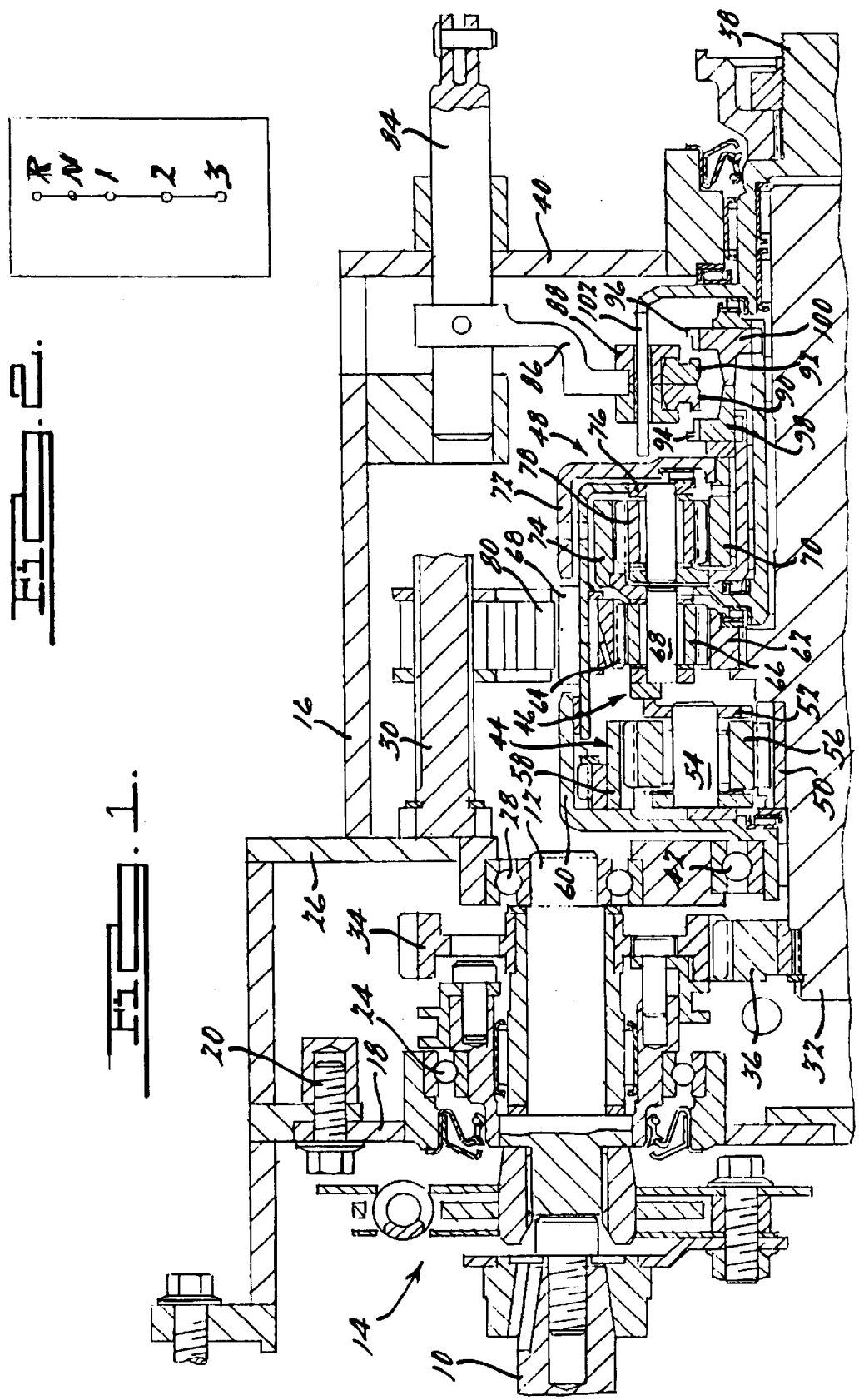

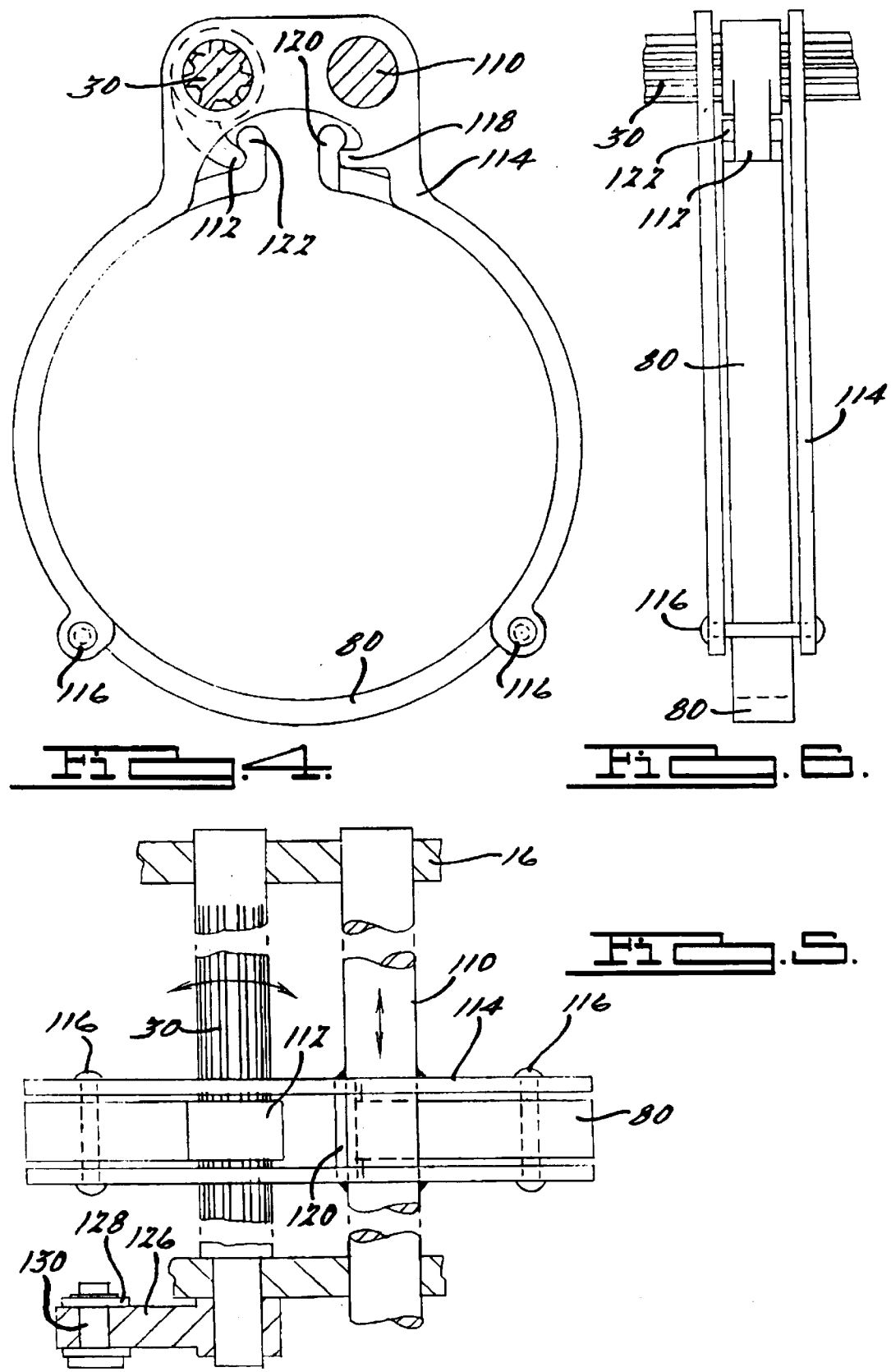

MULTIPLE SPEED AUTOMOTIVE TRANSMISSION

BACKGROUND OF THE INVENTION

1. Field of the Invention

This invention relates to the field of automotive transmissions. It pertains particularly to such transmissions providing synchronized speed ratio changes.

2. Description of the Prior Art

Conventional manually-operated automotive transmissions employ a system of meshing gear-pinion pairs supported on a main shaft and a parallel countershaft or layshaft. However, various attempts have been made to use epicyclic gearing in a manual transmission. Epicyclic gearing is a system of gears in which one or more gears travel around the inside or outside of another gear whose axis is fixed. An epicyclic train is a combination of epicyclic gears, in which some or all the gears rotate about an axis and translate or revolve around that axis.

U.S. Pat. No. 787,908 describes a manual transmission producing a direct drive forward speed ratio and forward and reverse low speed ratios by alternately engaging two brake bands and a clamping disc, each associated with one of these speed ratios. The transmission includes a cluster pinion having three gears, each pinion meshing with a gear driven by an engine shaft.

U.S. Pat. No. 1,005,186 describes a transmission that produces low speed forward drive and reverse drive by selective engaging brake bands for holding sun gears against rotation. A cluster gear having three planet pinions meshes with an output sun gear, a forward drive sun gear and a reverse drive sun gear, respectively. A friction clutch driveably connects the transmission output and a drive shaft.

Each of these transmissions produces reverse drive and low speed forward drive by alternately depressing pedals that cause engagement of a corresponding brake band. Direct drive results when these pedals are released. The axial position of each brake band is fixed so that the band continually surrounds the corresponding brake drum; its position is not altered by any other action including manipulation of a gear selector lever by the vehicle operator.

SUMMARY OF THE INVENTION

It is an object of this invention to provide an epicyclic manual transmission controlled by holding selected components for each speed ratio in response to movement of a gear selector lever. Advantages of the present invention include a low cost assembly requiring only one friction element engagement, i.e., one brake band to engage multiple components, elimination of a dry clutch located between an engine shaft and transmission input shaft. Furthermore, the transmission according to the present invention produces synchronized speed ratio changes with need for any synchronizers. Elimination of these components reduces the required space, cost and complexity of the assembly compared to those of conventional transmissions.

A multiple speed transmission according to this invention produces each gear ratio in response to movement of a gear selector lever and manipulation of a clutch pedal. The transmission includes an input shaft, an output shaft, multiple planetary gearsets driveably connected to the input shaft, a forward drive output component, a reverse drive output component, the gearsets including members alternately held against rotation to produce a gear ratio corresponding to each held gearset member and released for rotation. A portable brake band is adapted alternately to engage and hold said gearset members against rotation and to disengage and release said gearset members for rotation. A cartridge supporting the brake band moves alternately to said gearset members and transports the brake band to said gearset members for engagement therewith. A coupler, for driveably connecting the output shaft alternately to said forward drive output component and reverse drive output component, concurrently disconnects the output shaft from said forward drive output component and reverse drive output component.

BRIEF DESCRIPTION OF THE DRAWINGS

FIG. 1 is a partial cross-section of a multiple speed transmission according to the present invention. The centerlines are axes of symmetry for most of the components that rotate about the centerlines.

FIG. 2 is a top view of a gear shift selector showing the various operating speeds of the transmission of FIG. 1.

FIG. 6 is a side view of the shift rails and assembly of FIGS. 4 and 5.

FIG. 7 is a schematic diagram showing the kinematic arrangement of a transmission according to this invention.

FIG. 8 is a schematic diagram showing a technique for engaging and releasing a brake band used in a transmission according to this invention.

DESCRIPTION OF THE PREFERRED EMBODIMENT

Figure 3:
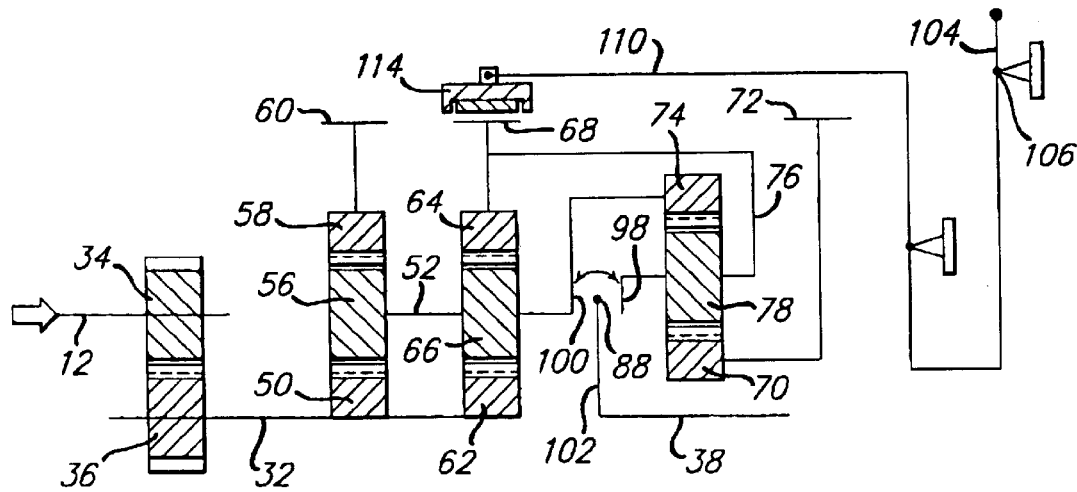
FIG. 3 is a schematic diagram of the kinematic arrangement of a transmission according to this invention.

Referring first to FIG. 1 and 2, a shaft 10 driven by a power source, such as the crankshaft of an internal combustion engine, is alternately driveably connected and disconnected from an intermediate shaft 12 through operation of a drive clutch 14 adapted to driveable connect shafts 10 and 12. A clutch pedal operates to disengage the shafts when the pedal is depressed and to connect the shaft when the pedal is released.

The gearing, brakes, couplings and shafts of the transmission are located in a housing 16, which includes a first bulkhead 18, connected by bolts 20 to the housing and supports bearing 24, which partially supports shaft 12. A second bulkhead 26 supports a bearing 28 and an axially extending brake cartridge rails 30, 110. Bearings 24 and 28 support intermediate shaft 12.

The layshaft gearing for driveable connecting shaft 12 and input shaft 32 includes input pinion 34, supported on shaft 12, and a gear 36, driveably connected by a spline to input shaft 32.

An output shaft 38, axially aligned with input shaft 32, is supported on the input shaft and housing cover 40 by needle bearings. The left hand end of the input shaft is supported by a bearing 42 carried on bulkhead 26.

Surrounding the input shaft are three planetary gearsets 44, 46, 48. The first gearset includes a sun gear fixed to, or formed integrally with input shaft 32; ring gear 58; and a first set of planet pinions 56, in continuous meshing engagement with sun gear 50 and ring gear 58 and rotatably supported on stub shaft 54, which is fixed to a carrier 52. Sun gear 58 is fixed by a spline to a reverse/first gear brake drum 60, which is supported rotatably on the input shaft and bulkhead 26.

The second gearset includes a sun gear 62, driveably connected to input shaft; a ring gear 64; carrier 52; and a second set of planet pinions 66 rotatably supported on stub shaft 68 of the carrier 52 and in continuous meshing engagement with sun gear 62 and ring gear 64. The sun gear 64 is driveably connected to a second speed brake band 68.

The third gearset 48 includes sun gear 70, driveably connected to a third-speed brake band 72; a ring gear 74, driveably fixed to carrier 52; a carrier 76; and a third set of planet pinions 78, rotatably supported on the stub shaft of a carrier 76 in continuous meshing engagement with sun gear 70 and ring gear 74. Carrier 76 is driveably connected to brake drum 68.

Rail 30 supports a brake band 80 for movement axially to three positions: adjacent the R-1 brake drum 60, the second-speed brake drum 68, and third-speed brake drum 72. When a clutch pedal is depressed, brake band 80 moves radially away from the brake drums. When the clutch pedal is released, band 80 is forced radially inward by a spring into driving engagement with the brake drum corresponding to the gear ratio selected by the vehicle operator resulting from movement of a gear selector lever, which moves in the path shown in FIG. 3.

Similarly a rail 84, supported slidably on the housing 16 and cover 40, moves in response to movement of the gear selector lever. Rail 84 carries an arm 86, fitted within a recess formed in a coupler 88 having clutch teeth 90, 92 adapted to engage alternately dog clutch teeth 94, 96 located at the radially outer ends of reverse coupler 98 and forward coupler 100 as rail 84 moves rightward and leftward in response to movement of the gear selector lever. Coupler 88 is rotatably fixed to shaft 38 but slides along the axis of the output shaft. Reverse coupler 98 is driveably connected to carrier 76 and brake band 68; forward coupler 100 is driveably connected to carrier 52.

Output shaft 38 includes an arm 102 that extends axially supporting member 88 for axial displacement thereon and permits rotation of the output shaft about its axis with respect to member 88.

As shift rail 84 moves leftward from the position of FIG. 1, clutch teeth 90 move into meshing engagement with clutch teeth 94 on the reverse coupler 98, thereby driveably connecting carrier 76 to output shaft 38. When shift selector rail 84 moves rightward from the position shown in FIG. 1, coupler 88 disengages reverse coupler 98, clutch teeth 92 are brought into meshing engagement with dog teeth 96, and forward coupler 100 and carrier 52 are brought into driving engagement with output shaft 38. When rail 84 is in the position of FIG. 1, neither of the couplers is driveably engaged, and output shaft 38 is disconnected from the input shaft 32. This is the position corresponding to the neutral position of the gear selector lever.

FIG. 3 shows a rail 110 supporting cartridge 114, which carries brake band 80. A gear selector lever is moved by the vehicle operator among positions corresponding to the selected, desired gear. In response to this movement, lever 104 pivots at a fulcrum 106 and causes cartridge 114 to move axially to the brake drum corresponding to the selected gear.

In operation, the input shaft is driven approximately 40% faster than the speed of shaft 12 through the layshaft gear arrangement that includes pinion 34 and gear 36. The first forward speed gear ratio results after the operator depresses the clutch pedal, which disengages drive clutch 14, moving the gear selector lever to the "1" position, which causes the brake band assembly 80 to move leftward to a position surrounding brake drum 60 and shift rail 84 to move rightward causing forward coupler 100 to engage teeth 92 of coupler 88, thereby connecting output shaft 38 to carrier 52. Thereafter, the operator releases the clutch pedal, which causes the drive clutch to engage drum 60, thereby connecting engine shaft 10 through the layshaft gear arrangement to input shaft 32.

When the transmission components are so positioned, sun gear 50 is overdriven in relation to speed of shaft 10, ring gear 58 is held fixed against rotation due to engagement of the brake band 80 on drum 60, and carrier 52 is underdriven, approximately 2.870 less than the speed of the engine shaft. Carrier 52 drives forward coupling 100, which drives output shaft 38.

An upshift to the second forward speed ratio results when the operator moves the gear selector lever to the "2" position. This action maintains forward coupler 100 engaged with the output shaft and moves the brake band to the position of FIG. 1, where it engages brake drum 68 to hold it fixed against rotation on the transmission housing. These steps cause sun gear 62 to be overdriven, ring gear 64 to be held fixed against rotation, and carrier 52 and output shaft 38 to be underdriven approximately 1.678 less than the speed of the engine shaft.

An upshift to the third forward speed ratio moves the brake band assembly 80 rightward from the position of FIG. 1 in response to movement of the gear selector lever and maintains forward coupling 100 engaged with output shaft 38. These steps cause engagement of brake band 80 on brake drum 72 and holding sun gear 70 fixed to provide a torque reaction. Sun gear 62 is overdriven through the input layshaft gearset, carrier 52 and ring gear 74 turn at the same speed, ring gear 64 and carrier 76 rotate at the same speed, and the output is taken through carrier 76, coupler 100 and output shaft 38.

Reverse drive is produced when the vehicle operator moves the gear selector lever to the "R" position, which causes brake band assembly 80 to move leftward adjacent brake drum 60, and reverse coupler 98 to engage the output shaft 38 through mutual engagement of clutch teeth 90 and 94. In this case, sun gears 50 and 62 are overdriven, ring gear 58 provides the torque reaction due to engagement of the brake band on drum 60, planet pinion sets 56, 66 revolve about the axis of the output shaft because they are mounted on a common carrier 52 and the output is taken at the mutually connected sun gear 64, carrier 76, coupler 98, and output shaft 38.

Figure 4:
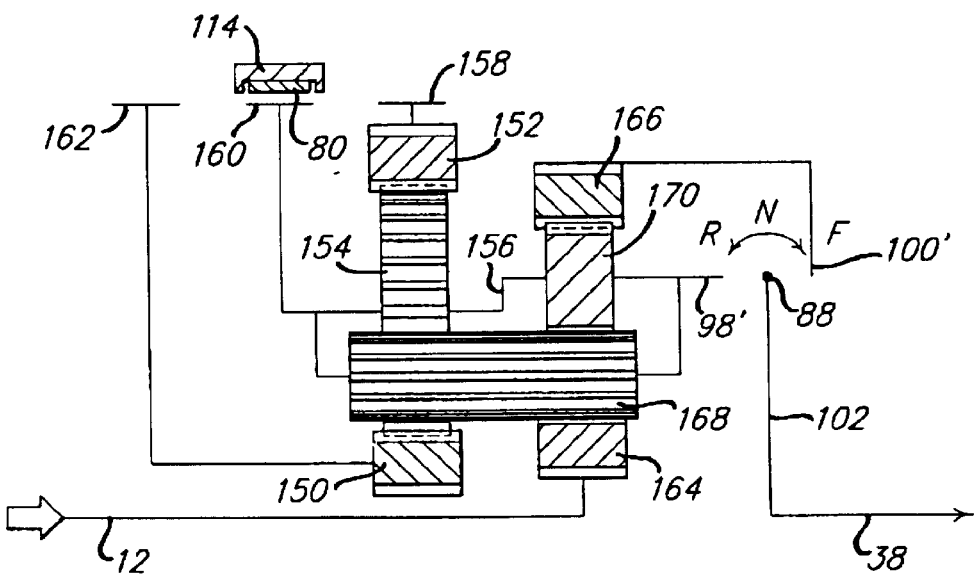
FIG. 4 is an end view of the brake band and its cartridge assembly.
Figure 5:
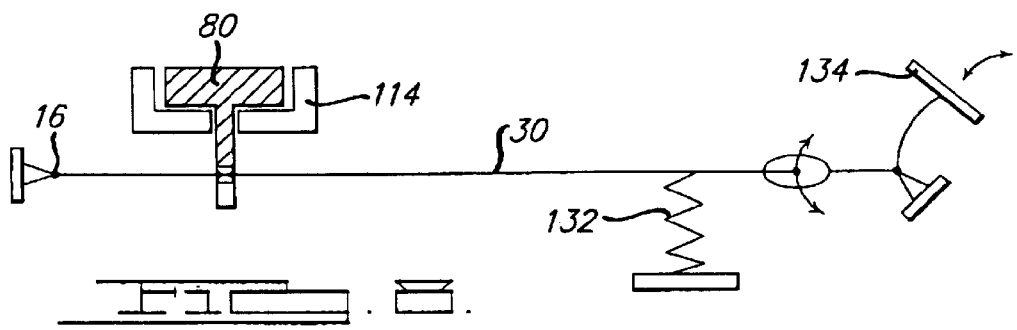
FIG. 5 is a top view of the assembly of FIG. 4.

Referring now to FIGS. 4–6, a brake band and cartridge assembly are supported for axial displacement on a rail 110 having a circular cross section, and on a rail 30 having an exterior splined surface that engages complimentary splines formed on a finger 112 that engages with an end of brake band 80.

The cartridge 114 slides axially on rails 30, 110 in response to movement of the gear selector lever. When the vehicle operator depresses the clutch pedal, rail 30 rotates clockwise when viewed as shown in FIG. 4, bringing finger 112 out of engagement with the end of brake band 80 and releasing engagement of brake band with any of the brake drums 60, 68, 72. When the clutch pedal is released, rail 30 rotates counter-clockwise causing finger 112 to rotate and band 80 to contract around a brake drum and to engage the brake drum that corresponds to the gear ratio selected by movement of the selector lever.

Cartridge 114, which supports brake band 80, includes legs that depend radially and are held together by rivets 116.

Cartridge 114 provides finger 118 fixed in position and permanently engaging the end 120 of band 80 that is opposite the end 122, which is engaged by the rotating finger 112.

Rail 110 is welded to the cartridge so that they move axially as a unit in response to movement of the gear selector lever.

As FIG. 5 shows, rail 30 is connected to a lever arm 126, which is pivoted about the axis of the rail as a rod 128, connected to lever arm 126 by a pin 130, moves vertically in response to movement of the shift selector lever.

FIG. 7 shows an alternate embodiment of this invention in which three forward speed ratios and a reverse drive ratio are produced by two planetary gearsets. The first gearset includes a sun gear 150, ring gear 152 surrounding the sun gear, and a set of planet pinions 154 in continuous meshing engagement with the sun gear and ring gear and rotatably supported on a carrier 156. Members of the first gearset are driveably connected respectively to brake drums. Sun gear 152 is driveably connected to brake drum 162, carrier 156 is driveably connected to brake drum 160, and ring gear 150 is driveably connected to brake drum 158. Cartridge 114 moves brake band 80 in response to movement of the gear shift lever, and the brake band engages alternately each of the brake drums and holds the corresponding element of the gearset fixed against rotation on the transmission housing when the clutch pedal is released.

The second planetary gearset includes a sun gear 164 driveably connected to the engine through input shaft 12, ring gear 166 surrounding the sun gear, a set of planet pinions 168 continually meshing with sun gear 164 and planet pinion set 154 and rotatably supported on carrier 156, and a set of planet pinions 170 in continuous meshing engagement with ring gear 166 and planet pinion set 168 and rotatably supported on carrier 156.

An extention 102 of output shaft 38 supports a coupler 88, which is moved leftward and rightward from the position shown in FIG. 7 to produce a drive connection between a reverse coupler 93' and a forward drive coupler 100'. The arrangement of the couplers and output shaft extension is substantially the same as that shown in FIG. 1. In the position of FIG. 7, coupler 88 is in a neutral position disconnected from either the forward drive or reverse drive couplers. Coupler 88 moves in response to movement of the gear shift lever to the forward drive or reverse drive position.

In operation, the vehicle operator disengages brake band 80 from the brake drums by depressing the clutch pedal and moves cartridge 114 alternately to the brake drum position associated with three forward drive positions and a reverse drive position. When the third forward speed position is selected, cartridge 114 moves leftward to the position of brake drum 162. When the second forward speed ratio position is selected, cartridge 114 is in the position shown in FIG. 7. When either the first forward gear or reverse drive is selected, cartridge 114 moves rightward to brake band 158 and output shaft 38 is driven either in a forward direction or reverse direction depending on whether coupler 88 is moved to engagement with carrier 156 through coupler 98' or into engagement with ring gear 166 through the exit of coupler 100'.

To produce the first forward speed ratio, sun gear 164 is driven from the engine through input shaft 12, ring gear 152 is held fixed against rotation due to engagement of brake band 80 on drum 158 when the clutch pedal is released. The output is taken at ring gear 166 through the connection between couplers 88 and 100' to output shaft 38, which is driven at about 0.268 times the speed of the engine.

When the shift lever is moved to the second forward speed position, cartridge 114 moves to the position of FIG. 7. When the clutch pedal is released, brake band 80 engages drum 160 and holds carrier 156 against rotation to provide a torque reaction. Sun gear 164 is driven from the engine through the input shaft 12, and ring gear 166 is underdriven at approximately 0.461 times the speed of the engine. The output shaft 38 is driven at the speed of ring gear 166 when coupler 88 engages coupler 100'.

An upshift to the third speed ratio results when the gear selector is moved to the three position, which action causes cartridge 114 to move leftward after the clutch pedal is released. Then brake band 80 holds drum 162 and sun gear 150 against rotation, providing a torque reaction. Ring gear 166 and output shaft 38 are underdriven at approximately 0.738 times the speed of the engine.

To produce reverse drive in response to movement of the shift lever to the "R" position, cartridge 114 moves to the position of drum 158 and coupler 88 moves into complete drive engagement with reverse drive coupler 98'. Sun gear 164 is driven directly by the engine through input shaft 12 ring gear 152 is fixed against rotation, and ring gear 166 and output shaft 38 are underdriven in the reverse direction at approximately 0.268 times the speed of the engine.

FIG. 8 shows rail 30 supported on housing 16 and carrying cartridge 114 and band 80 among the brake bands 60, 68 and 72 of FIG. 3. The diagram shows only that portion of the assembly located below a horizontal axis of symmetry. Spring 132 urges band 80 to contract radially into engagement with the brake drums by forcing rod 128 upward and in that way to rotate rail 30 about its axis, which action causes finger 112 to contract the band circumference onto the outer surface of the selected brake drum. When clutch pedal 134 is depressed, the force of spring 132 is overcome and band 80 releases the brake drum for rotation. When pedal 134 is released, spring 132 causes band 80 to hold the selected brake drum against rotation.

The actuation technique described with reference to FIG. 8 can be applied to engage and release brake drums 158, 160, 162 of FIG. 7.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple gear ratio automotive transmission, comprising:

an input shaft;

an output shaft;

multiple planetary gearsets driveably connected to the input shaft, a forward drive output component, a reverse drive output component, the gearsets including members alternately held against rotation to produce a gear ratio corresponding to each held gearset member and released for rotation;

a portable brake band, adapted alternately to engage and hold said gearset members against rotation and to disengage and release said gearset members for rotation;

a cartridge supporting the brake band and moveable alternately to said gearset members, for transporting the brake band to said gearset members for engagement therewith; and a coupler for driveably connecting the output shaft alternately to said forward drive output component and reverse drive output component, and for concurrently disconnecting the output shaft from said forward drive output component and reverse drive output component.

2. The transmission of claim 1, further comprising:

brake drums, each brake drum driveably connected to a gearset member corresponding to a gear ratio, adapted for engagement by the brake band;

a gear selector lever moveable manually among gear ratio positions, the cartridge moveable in response movement of the gear selector lever to the brake drum that is connected to the gearset member corresponding to said gear ratio position;

a clutch pedal moveable manually between disengaged and engaged positions; and spring means urging the clutch pedal to the engaged position and the brake band into engagement with said gearset members thereby holding said gearset members against rotation, manual movement of the clutch pedal to the disengaged position causing the brake band to disengage said gearset members thereby releasing said gearset members for rotation.

3. The transmission of claim 2, further comprising:

a first rail fixed against rotation and fixed to the cartridge, supporting the cartridge for movement to said gearset members in response to movement of the gear selector lever; and a second rail supporting the cartridge, adapted, in response to movement of the clutch pedal, alternately to engage mutually the brake band and a brake drum corresponding to the current position of the gear selector, thereby holding said brake drum and said corresponding gearset component against rotation, and to disengage the brake band and said brake drum, thereby releasing said brake drum and corresponding gearset component for rotation.

4. A multiple speed automotive transmission, comprising:

an input shaft;

an output shaft;

first, second and third planetary gearsets, each gearset having a sun gear, ring gear, carrier, and a set of planet pinions rotatably supported on the carrier and meshing with the ring gear and sun gear, the sun gears of the first and second gearsets driveably connected to the input shaft, the carriers of the first and second gearsets and ring gear of the third gearset being mutually driveably connected, the carrier of the third gearset and ring gear of the second gearset being mutually driveably connected, having a forward drive output component and a reverse drive output component;

a portable brake band fixed against rotation, adapted alternately to hold against rotation the ring gear of the first gearset, the ring gear of the second gearset, and the sun gear of the third gearset, and to release for rotation the ring gear of the first gearset, the ring gear of the second gearset, and the sun gear of the third gearset;

a cartridge for transporting the brake band to the ring gear of the first gearset, the ring gear of the second gearset, and the sun gear of the third gearset for engagement therewith; and a coupler for driveably connecting the output shaft alternately to said forward drive output component and reverse drive output component, and for concurrently disconnecting the output shaft from said forward drive output component and reverse drive output component.

5. The transmission of claim 4, further comprising:

a first brake drum driveably connected to the ring gear of the first gearset;

a second brake drum driveably connected to the ring gear of the second gearset;

a third brake drum driveably connected to the sun gear of the third gearset;

the portable brake band fixed against rotation is adapted alternately to hold each brake drum against rotation and to release each brake drum for rotation;

a gear selector lever moveable manually among gear ratio positions, the cartridge moveable in response to movement of the gear selector lever alternately to the brake drums;

a clutch pedal moveable manually between disengaged and engaged positions; and spring means urging the clutch pedal to the engaged position and the brake band into engagement with a brake drum thereby holding the engaged brake drum against rotation, manual movement of the clutch pedal to the disengaged position causing the brake band to disengage a brake drum thereby releasing said brake drum for rotation.

6. The transmission of claim 5, wherein the coupler moves in response to movement of the gear selector lever to driveably connect the output shaft alternately to the carrier of the third gearset and carrier of the first and second gearsets, and to concurrently disconnect the output shaft from the carrier of the third gearset and carrier of the first and second gearsets.

7. The transmission of claim 5, further comprising:

a first rail fixed against rotation and fixed to the cartridge, supporting the cartridge for movement to said brake drums in response to movement of the gear selector lever; and a second rail supporting the cartridge, adapted, in response to movement of the clutch pedal, alternately to engage mutually the brake band and a brake drum, thereby holding said brake drum and said corresponding gearset component against rotation, and to disengage the brake band and said brake drum, thereby releasing said brake drum and corresponding gearset component for rotation.

* * * * *